United States Patent [19]

Silva et al.

[11] 4,015,677
[45] Apr. 5, 1977

[54] AUTOMATIC PATIENT WEIGHING SYSTEM

[75] Inventors: John Silva; Robert A. Garrett, both of San Diego; Franklin R. Borkat, La Mesa; Frank Young, San Diego, all of Calif.

[73] Assignee: The United States of America as represented by the Secretary of the Navy, Washington, D.C.

[22] Filed: July 25, 1975

[21] Appl. No.: 599,295

[52] U.S. Cl. .................. 177/165; 177/210 FP; 177/DIG. 3
[51] Int. Cl.² ................ G01G 13/14; G01G 3/14
[58] Field of Search ......... 177/1, 25, 165, 210 FP, 177/DIG. 3; 235/151.33

[56] References Cited
UNITED STATES PATENTS

| | | | |
|---|---|---|---|
| 3,548,181 | 12/1970 | Fischer, Jr. et al. | 235/151.33 X |
| 3,662,845 | 5/1972 | Pratt | 177/25 |
| 3,709,309 | 1/1973 | Williams, Jr. et al. | 177/165 |
| 3,770,069 | 11/1973 | Loshbough | 177/1 |
| 3,812,923 | 5/1974 | Rock | 177/165 X |
| 3,853,267 | 12/1974 | Cadwell et al. | 235/151.33 |
| 3,863,724 | 2/1975 | Dalia, Jr. | 177/25 |
| 3,876,018 | 4/1975 | Mracek et al. | 177/245 X |
| 3,888,321 | 6/1975 | Wiiki et al. | 177/165 |
| 3,967,690 | 7/1976 | Northcutt | 177/DIG. 3 |

*Primary Examiner*—George H. Miller, Jr.
*Attorney, Agent, or Firm*—R. S. Sciascia; G. J. Rubens; J. W. McLaren

[57] ABSTRACT

A patient weighing system for automatically providing a visual display of instantaneous patient weight includes a bed assembly for receiving the patient which is supported by weight responsive means producing analog signals as a function of instantaneous total weight. The analog signals are converted to commensurate digital signals. A first storage register stores the digital signal representative of the weight of the bed assembly without the patient. A second storage register stores the digital signals representative of the total weight of the bed assembly including the patient. A difference digital signal is developed which is representative of the difference between the digital signals stored in the first and second storage registers, providing a net or remainder digital signal which is a function of patient weight. A suitable means responsive to the difference digital signal is provided for visually displaying the patient weight, preferably on a repetitive cyclic basis so that the patient weight visual data is constantly updated. In a preferred embodiment, a manually adjustable input is provided to compensate for additions to the bed weight not attributable to change in patient weight such as pillows, blankets, medical equipment, etc. Additionally, by storing the difference digital signal and comparing it with the next sequentially developed difference digital signal, a suitable change of patient weight visual display can be provided.

4 Claims, 4 Drawing Figures

AUTOMATIC PATIENT WEIGHING SYSTEM

BACKGROUND OF THE INVENTION

In many instances of seriously ill or seriously injured patients, constant monitoring of the patient's fluid balance is required. For example, patients who have been severely burned or sustained multiple injuries in motor vehicle accidents may, as a result of their condition, lose or gain body fluids beyond a safe limit. Obviously such patients cannot be readily removed from a hospital bed for repeated weighing in order to constantly monitor their body weight changes which could be indicative of critically important physical conditions. Moreover, it is desirable that patient weight be constantly and accurately determined so that appropriate corrective action may be taken by the attendant medical staff, if and when necessary. Prior art bed scales which are currently commercially available are designed principally for use in connection with blood dialysis procedures and are not readily applicable to the type of constant patient weight monitoring function envisaged by the present invention.

Accordingly, it is highly desirable that a patient weighing system be provided which gives a continuous display of weight for such seriously ill or injured patients and, in addition, a constant display of change of weight, as well. Such a change of weight display should indicate the total amount of loss or gain in weight to within at least one pound or a fraction of one pound together with visual presentation of the patient's current total weight.

SUMMARY OF THE INVENTION

The patient weighing system of the present invention conceives a bed assembly for receiving and supporting a patient, with the weight of the bed assembly transferred to underbed sensing units through a system of levers connected to a strain gauge load cell. The load cell produces an analog voltage output which is a function of the load caused by the instantaneous weight of the bed assembly, whether it be with or without the patient.

One load cell is associated with the head of the bed assembly while a second load cell is associated with the foot of the bed assembly so that two analog voltages are produced in accordance with the total weight transmitted to the load cells. The voltages are suitably amplified and combined to provide a single analog voltage output indicative of total weight.

A selective variable weight adjustment may be provided to produce a change in the analog voltage to compensate for small changes in weight of either an additive or subtractive nature such as the addition or removal of sheets, pillows, blankets, medical equipment, etc., from the bed assembly.

The resultant analog voltage is converted to digital form, preferably of a BCD code type, which may be received and stored in compatible digital storage registers. A first storage register may be employed for storing the digital signal which is representative of the weight of the bed assembly without a patient. A second storage register may be employed for storing the digital signal which was representative of the total weight of the bed assembly with the patient in it.

A difference digital signal representative of the difference between the digital signals stored in the first and second storage registers is developed which is representative of net patient weight. The difference digital signal is then impressed upon means responsive to visually display patient weight in terms of pounds, for example.

In a preferred embodiment of the present invention the procedural steps of receiving and comparing the stored digital signals are cyclically repeated so that the resultant computation of patient weight is constantly updated. Additionally, the preferred embodiment of the present invention includes a third digital storage register to store initially determined patient weight digital signals for comparison with the subsequently generated digital signal indicative of patient weight so that any change indicative of a loss or gain of patient weight may be indicated on a second visual display providing instantaneous information as to current change of weight in terms of 1 pound or a fraction of 1 pound, for example, as may be desired.

The first storage register which stores the digital signal representative of the weight of the bed assembly without the patient is externally actuated by manual operation of suitable switch at an appropriate time by a nurse, attendant, or physician prior to the patient being received and supported in the bed assembly. At the time of such external actuation for receiving the signal to be stored, the total amount of blankets, sheets, pillows, and other equipment which it is anticipated will be supported by the bed assembly should be on the bed so that the stored digital signal is representative of the entire weight of the complete bed assembly as it is to be used, excepting only the weight of the patient.

A control clock operative at any convenient suitable rate, such as 1Hz, for example, may be employed to actuate the analog-to-digital conversion cyclically and repetitively and also to cause each newly developed digital signal, representative of the weight of the bed assembly complete with the weight of the patient, to be compared with the stored digital signal representative of the weight of the complete bed assembly without the patient for developing difference digital signals as a function of current patient weight. Such a control clock may also be employed conveniently for the actuation of other portions of the system as may be desired and as will be understood from the description of the functional operation of the preferred embodiments as more fully explained hereinafter.

Accordingly, it is a primary object of the present invention to provide an automatic patient weighing system for visually indicating a constantly updated patient weight.

An ancillary primary object of the present invention is to provide such an automatic patient weighing system which will provide a constant indication of any change in weight of the patient being monitored whether it be a loss or gain in weight.

A concomitant object of the present invention is to provide such an automatic patient weighing system which accomplishes the constant monitoring of patient weight through the use of digital techniques which are readily adaptable to embodiment in solid state electronic units and elements.

A further object of the present invention is to provide such an automatic patient weighing system which readily accommodates adjustment to compensate for the addition or removal of weight from the bed assembly supporting the patient such as pillows, sheets, medical equipment, etc.

Another most important object of the present invention is to provide such an automatic patient weighing system which is highly stable and reliable in its operation, as well as being extremely durable in the hospital environment, requiring only very minimal maintenance.

A further object of the present invention is to provide such an automatic patient weighing system which is so conceived as to be readily adaptable to have its solid state electronic portions fabricated in modular manner to facilitate such replacement as may be necessary on individual plug-in cards.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
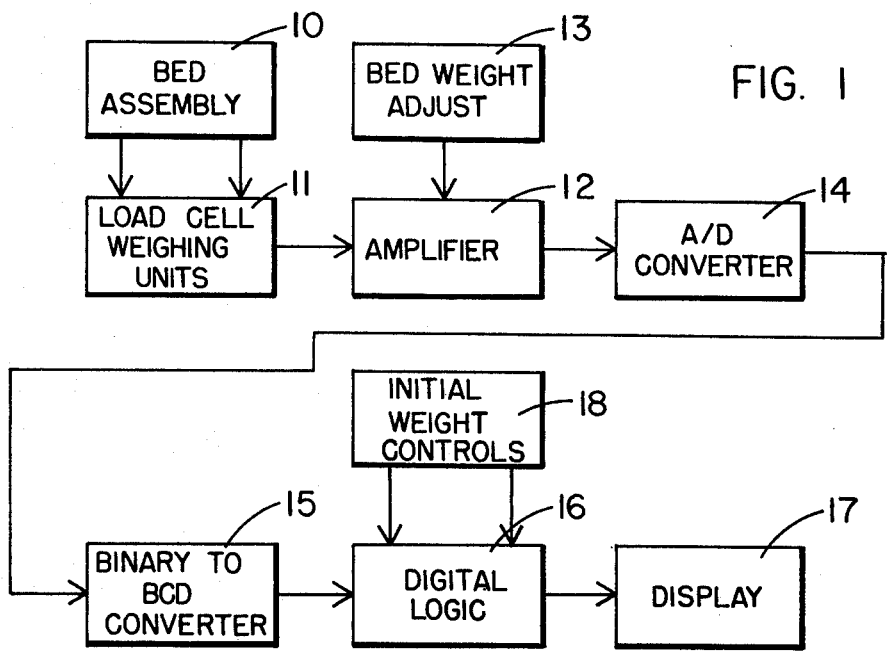
FIG. 1 is a schematic block diagram of an embodiment of the present invention.

FIG. 1 is a schematic illustration of one embodiment of the present invention. A bed assembly 10, which is designed to receive and support a patient, mechanically transmits its load to suitable load cell units 11. Such load cell units are used to convert the mechanical load of the bed assembly 10 to a commensurate analog electrical signal and may comprise strain gauges or LVDTs (Linearly Variable Differential Transformer). Several types of appropriate load cells are commercially available and readily adapted to convert the strain or displacement caused by the weight of a load to a commensurate analog electrical signal. The concept of the present invention is not limited to a particular type of mechanical-electrical transducer but any appropriate transducer which is readily adaptable to achieve the objects of the present invention may be employed within its concept.

The weight of the bed assembly 10 may be transmitted to the load cell units 11 through a suitable lever system, for example, to accommodate the signal range of the load cell units 11 to the anticipated range of weights which may be encountered in the use of the bed assembly 10, from its minimum weight without patient to its maximum weight with the patient, blankets, pillows, additional equipments, etc.

Figure 2:
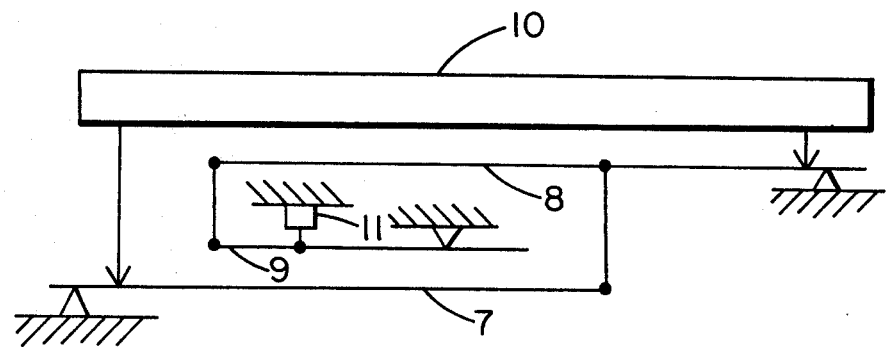
FIG. 2 is a schematic diagram of one type of lever system which may be employed to transmit the weight of the bed assembly to suitable load cell transducers.

One type of lever system for transferring the bed assembly weight to a load cell transducer is schematically represented in FIG. 2. Each of the two ends of the bed assembly 10 (the foot or the head supports of the bed) may rest on a lever system arranged as shown in FIG. 2 to produce two output, the sum of which is representative of the total weight of the whole bed assembly, with or without patient, as the case may be.

One end of the bed assembly 10 may transmit its weight to levers 7 and 8 as indicated by the downward pointing arrows. The levers 7 and 8 are pivotal about respective knife edges as represented by the triangles at the left and right-hand sides of FIG. 2, respectively. Lever 7 is movably linked to lever 8, which in turn is connected by articulated linkage to a third lever 9. Lever 9 bears against a knife edge at one end as shown and is also connected to a load cell 11, which may be of the strain gauge type, for example.

As shown in FIG. 1 the electrical output signals developed by the load cell units 11 are fed to an amplifier 12 which may include separate amplification means for a load cell associated with the foot of the bed and a separate load cell associated with the head of the bed. If separate amplification means for two load cell units are employed, a third amplification means may be included within unit 12 to sum the electrical signals associated with the foot and the head of the bed to provide an electrical signal as a function of the total weight.

A "bed weight adjust" unit 13 is provided and connected to the amplifier 12 to afford selective adjustment of the amplitude of the analog electrical signal output of amplifier 12 to compensate for either the addition or removal of pillows, blankets, etc., to the bed assembly.

The analog output signal of the amplifier 12 is connected as the input to an analog-to-digital converter 14 where it is converted to a binary digital form. In the preferred embodiment of the present invention the binary digital signal thus developed as a function of the instantaneous total weight of the bed assembly (whether it be with or without the patient) is converted to a binary coded decimal form in a binary-to-BCD converter 15.

The BCD signals are connected to a digital logic element which includes first and second storage registers. The first storage register stores the digital signal representative of the weight of the bed assembly without the patient, while a second storage register stores the digital signal representative of the total weight of the bed assembly; a means for developing a difference digital signal representative of the difference between the two digital signals stored in the first and second storage registers is included within the digital logic 16.

The difference digital signals developed by the digital logic 16 are connected to an appropriate display means 17 which is responsive to the received signals for visually displaying the patient weight, i.e., the difference between the two digital signals as previously explained. Such display may take the form of an appropriate arrangement of numeric and hexadecimal indicators which are commercially available and are directly operative to decode input digital signals and produce alpha and numeric visual output display.

The embodiment of the present invention also includes initial weight controls 18 in the form of manually actuated switch controls which permit the entry of the digital signals representative of the weight of the bed assembly 10 without the patient into the first storage register of the digital logic 16, and the entry of the total weight of the bed assembly 10 including the weight of the patient into the second storage means of digital logic 16.

Figure 3:
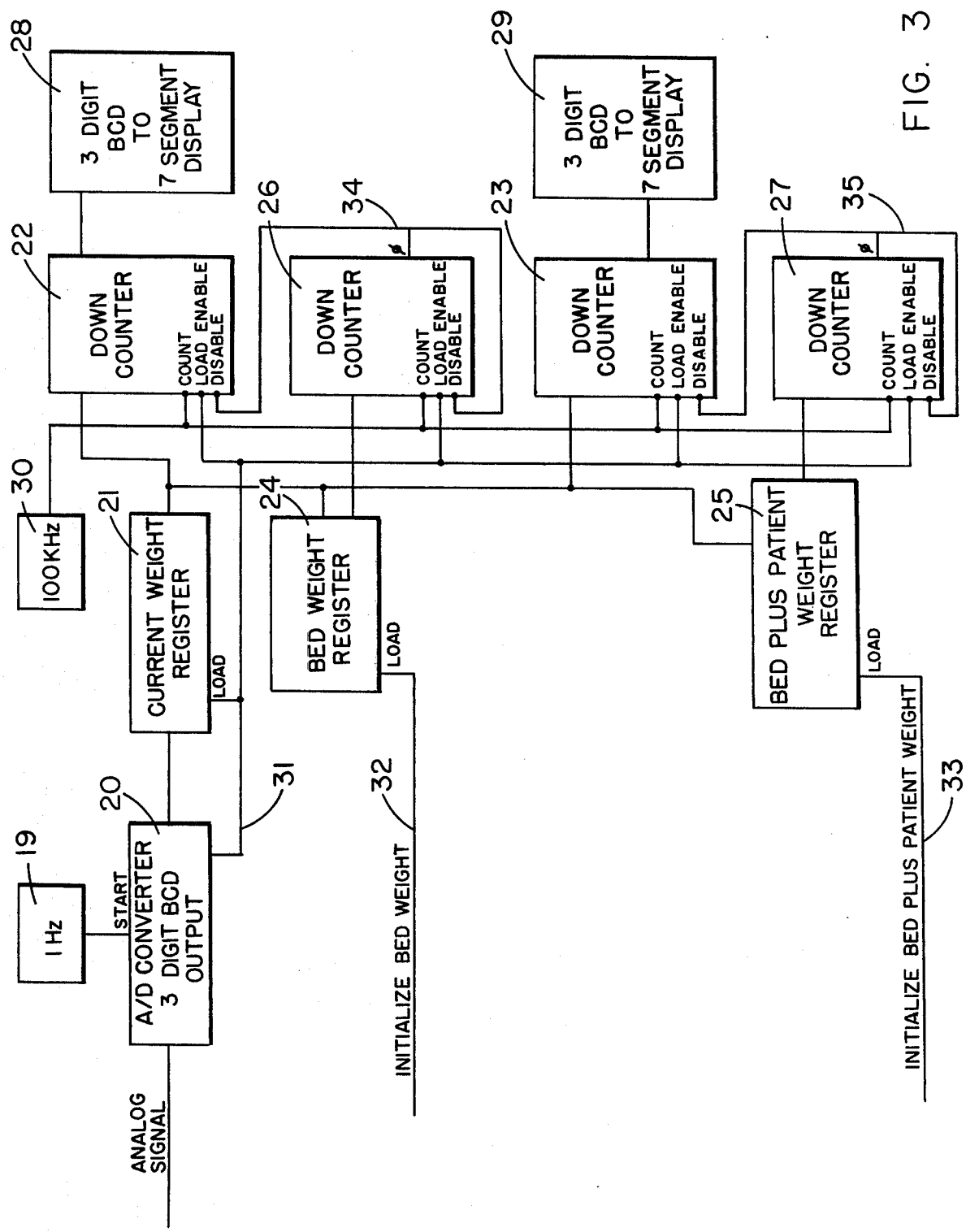
FIG. 3 is a more detailed schematic representation of a portion of the system schematically illustrated in FIG. 1.

FIG. 3 is a more detailed schematic illustration of that portion of an embodiment of the present invention as shown in FIG. 1 from the analog signal developed as the output of amplifier 12 to the visual display indicators 17.

In the illustration of FIG. 3 the A/D converter 14 and the binary to BCD converter 15 of FIG. 1 are combined in a single element 20 which performs the function of converting its received analog input signal into a three digit, binary coded decimal output.

The A/D converter 20 also receives an input from a control clock 19 which is operative to control the repetitive cyclic operation of the digital logic in a manner explained in detail hereinafter. The control clock 19 may be of any convenient frequency, such as 1Hz, for example.

The three digit BCD output of the A/C converter 20 is connected as the input to a current weight register 21 and its output, in turn, is connected to two down counters, 22 and 23. The output of the current weight register 21 representative of the instantaneous weight of the bed assembly with or without patient, as the case may be, is also connected to the inputs of two storage registers, the bed assembly weight only register 24 and the bed plus patient register 25.

The output of the bed assembly register 24 is connected as an input to a down counter 26 and the output of the bed plus patient weight register 25 is connected as the input to a down counter 27. The output of down counter 22 is connected to a three digit, BCD-to-seven-segment display element 28 which visually presents the patient weight; the output of down counter 23 is connected as the input to a three digit, BCD-to-seven-segment display element 29 which visually presents the change in patient rate. A clock 30 operative at a higher frequency than the control clock 19, such as 100KHz, for example, provides the clocking input pulses for the down counters 22, 23, 26, and 27.

An initialize bed weight control is connected to the bed weight only register 24 to control its loading with the appropriate digital input signal for storage and is included within the same elements as were indicated as initial weight controls 18 in FIG. 1. Similarly, the initialize bed plus patient weight control connection shown as an input to the bed plus patient weight register 25 is part of the initial weight controls 18 shown in FIG. 1.

OPERATION

In operation the automatic patient weighing system of the present invention develops a digital signal representative of the instantaneous total weight of the bed assembly without the patient in the form of a BCD signal. That signal is developed as a result of the analog signals generated through an appropriate lever system supporting the bed assembly and mechanical-electrical transducers such as strain gauges or LVDT units, for example.

The conversion in the A/D converter 20, is initiated and controlled by the clock pulses of the 1Hz control clock 19. Upon completion of the A/D conversion in element 20, an output done pulse is produced and connected to line 31 which actuates the load control of the current weight register 21 to accept the BCD signal from the A/D converter 20. The done pulse is also connected on line 31 to enable loading of down counters 22, 26, 23, and 27.

The output of the current weight register in the form of a BCD signal is connected to the down counter 22, bed weight register 24, and down counter 23, as well as bed plus patient weight register 25; such digital signal is accepted into the down counters 22 and 23 by reason of their having been enabled by the signal connected to line 31.

In the preferred operation, the bed weight of the bed assembly without the patient is admitted into the bed weight register 24 by actuation of the initial weight control 18 as shown in FIG. 1, such enabling signal being received over line 32 of the illustration of FIG. 3, enabling the bed weight register 24 to load with the appropriate digital signal representative of the weight of the bed assembly without the patient.

The patient is then placed into the bed assembly and as a result a BCD signal is developed which is representative of the entire bed assembly including the weight of the patient. The initial weight control 18 of FIG. 1 is then actuated to develop a signal which is transmitted along line 33 of FIG. 3, enabling the bed plus patient weight register 25 to be loaded with the BCD digital signal representative of the weight of the bed assembly including the patient when the patient is initially received and supported by the bed.

After these initial digital signals are stored in the bed weight register 24 and the bed plus patient register 25, at the next output pulse of the control clock 19, the digitally converted signal produced by the A/D converter 20 is fed as the input to the current weight register 21 which is enabled to receive and load the BCD digital signal for storage upon the reception of the done pulse received along line 31 which signifies that the conversion process has been completed.

The pulse along line 31, as mentioned previously, also enables down counters 22, 26, 23, and 27 to receive and load the digital signals at their respective inputs. Down counter 22 receives and loads the digital output from the current weight register 21, while down counter 26 receives and loads the output of the bed weight only register 24. The clock 30 then proceeds to actuate down counters 22 and 26 so that they count down synchronously. Upon down counter 26 reaching the zero count, it produces a disable signal over line 34 which enables down counter 22 so that its retained count output is the difference between the digital signal stored in the first storage register 24 representative of bed weight only and the digital count stored in the second storage register 21 representative of the complete weight of the bed assembly including the patient.

The difference digital signal produced by down counter 22 is connected as the input to a three digit, BCD-to-seven segment display element 28 for visually presenting patient weight. Unit 28 may be a numeric and hexadecimal indicator of a commercially available solid state type which incorporates decoders, driver, and memory in a unitized element.

Simultaneous with the actuation of down counters 22 and 26, down counters 23 and 27 are also enabled and actuated. Down counter 23 receives the current total weight digital output of register 21, and down counter 27 receives the initial total bed plus patient weight digital signal from register 25. The counters 23 and 27 are synchronously counted down until the total count is down counter 27 has been reduced to zero at which time a disable signal is connected through line 35 to disable the down counter 23. The down counter 23 thus has a remaining digital signal representative of the difference between the current total weight of the bed assembly including the patient and the initial total weight of the bed assembly including the patient.

Accordingly, the output of down counter 23 is a digital signal representative of any change in weight of the patient subsequent to being placed in the bed assembly. The current change in patient weight is displayed on a three digit, BCD-to-seven-segment display 29 which is essentially of the same format and operative characteristics as previously described in connection with display unit 28 and may advantageously employ currently available solid state display conversion units.

In the embodiment illustrated in FIG. 3 a counter clock 30 is operative at 100KHz while the control clock 19 is operative at a frequency of 1Hz. Thus, between the control pulses produced by control clock 19, which have a repetitive frequency of one second, the down counting process performed as previously described is readily achieved by reason of the much higher frequency of 100KHz of the faster clock 30 which actuates the down counters 22, 26, 23, and 27.

It will be readily appreciated that the concept of the present invention as embodied in a preferred equipment schematically illustrated in FIGS. 1 and 3 provides not only an instantaneous, accurate, automatic, reliable visual display of patient weight but also provides the same automatic, instantaneous visual display of any change in patient weight. The change in patient weight visually displayed is representative of increase or losses of weight which take place subsequent to the patient being initially received into the bed assembly, when patient's weight totalled with that of the bed assembly is stored by a "load" enable signal transmitted over the initialize bed plus patient weight line 33.

Figure 4:
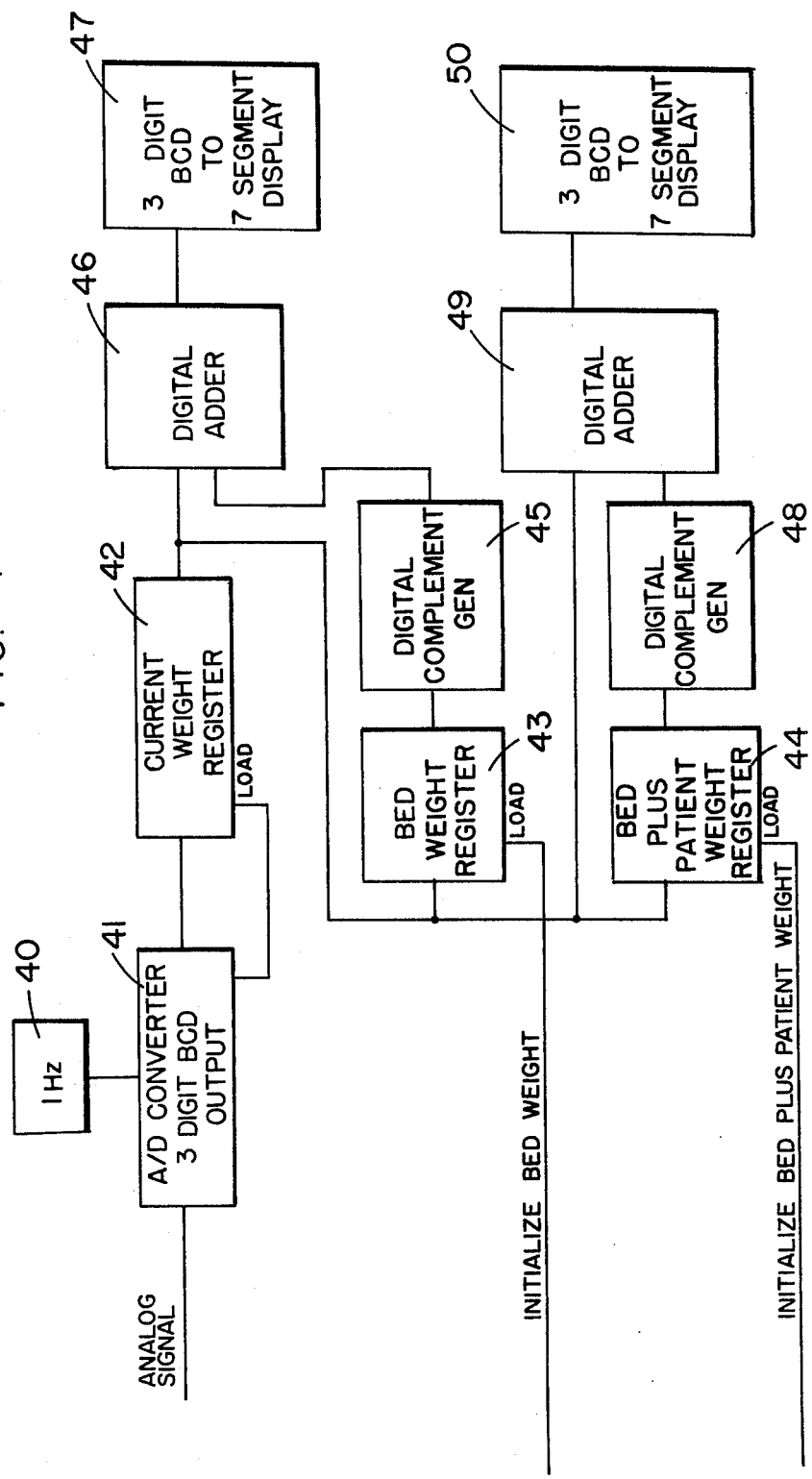
FIG. 4 is a schematically represented alternate embodiment of the present invention which may be employed as a variant of that portion of the system shown in FIG. 3.

FIG. 4 illustrates an alternate embodiment of the present invention wherein the technique of generating complement digital signals and summing such signals to perform an effective subtraction operation is employed rather than a down counter type of technique employed by the specific embodiment illustrated in FIG. 3.

In FIG. 4 the input signals and controls in terms of the analog signals, initialize bed weight control, and initialize bed plus patient weight control are the same as previously described in connection with the embodiment illustrated in FIG. 3. Similarly, the 1Hz control clock 40 operates to control the cyclically repetitive operational procedures of the embodiment of FIG. 4 much as was previously described in connection with the embodiment illustrated in FIG. 3.

The A/D converter 41 of FIG. 4 performs essentially in the manner previously described in connection with the explanation of the operation of the A/D converter 20 in FIG. 3, and the current weight register 42 operates essentially in the manner of the current weight register 21 of FIG. 3. In a like sense, the bed weight register 43 and the bed plus patient weight register 44 are operative in the manner of the analogous components 24 and 25 illustrated in FIG. 3.

However, in the particular embodiment illustrated in FIG. 4, the output of the bed weight register is connected to a digital complement generator 45 which operates to convert the digital signal output of the bed weight register 43 to its digital complement. The digital complement is then connected as the input to a digital adder or summing element 46 providing an output which is effectively the digital difference between the digital signal stored in the bed weight register 43 and the digital signal developed by the current weight register 42. Such difference digital signal is then fed as the input to a three digit, BCD-to-seven-segment display element 47 for visually presenting patient weight.

In an analogous fashion the digital output of the bed plus patient weight register 44 is connected as the input to a digital complement generator 48 which generates the digital complement of the digital signal representative of bed plus patient weight as stored in register 44. The output of the digital complement generator 48 is connected as the input to a digital adder or summing element 49 which then performs the function of effectively determining the digital difference between the initial bed plus patient weight as digitally stored in register 44 and the current bed plus patient weight as generated by the current weight register 42.

The digital signal output of the digital adder 49 is connected as the input to a three digit, BCD-to-seven-segment display element 50 for visually presenting change of patient weight.

Those skilled and knowledgeable in the pertinent arts will appreciate that the concept of the present invention provides an automatic patient weighing system which is reliable, accurate, and stable as well as being desirably adaptable and flexible in meeting varying requirements of different applications and usages.

Obviously many modifications and variations of the present invention are possible in the light of the above teachings. It is therefore to be understood that within the scope of the appended claims the invention may be practiced otherwise than as specifically described.

What is claimed is:

1. A patient weighing system comprising:
   a bed assembly for receiving and supporting a patient;
   weight responsive means supporting said bed assembly for producing analog signals as a function of instantaneous total weight;
   analog-to-digital conversion means for converting said analog signals to commensurate digital signals;
   a first storage register for storing the digital signal representative of the weight of said bed assembly without the patient;
   a second storage register for storing the digital signal representative of current total weight of said bed assembly with the patient;
   a first down counter connected to receive the digital count from said first storage register;
   a second down counter connected to receive the digital count from said second storage register;
   a control clock for cyclically actuating said analog-to-digital conversion means at a predetermined frequency and producing cyclic signals for enabling said first and second down counters to load the digital counts from said first and second registers, respectively;
   a second clock having a substantially higher frequency than said control clock and connected for simultaneously counting down said first and second down counters;
   a connection from the output of said first down counter producing a signal when it reaches zero count for disabling said second down counter, whereby the remainder digital count in said second down counter is representative of net patient weight; and
   means responsive to said remainder digital count for visually displaying patient weight.

2. A patient weighing system as claimed in claim 1 including means for selectively adjusting said analog signals to compensate for changes in the weight of said bed assembly.

3. A patient weighing system as claimed in claim 1 and including:
- a third storage register for storing the initial total weight of said bed assembly with the patient;
- a third down counter connected to receive the digital count from said third storage register;
- a fourth down counter connected to receive the digital count from said second storage register;
- a connection from said control clock for simultaneously enabling said third and fourth down counters;
- a connection from said second clock for simultaneously counting down said third and fourth down counters; and
- a connection from the output of said fourth counter producing a signal when it reaches zero count for disabling said third down counter, whereby the remainder digital count in said third down counter is representative of change in patient weight.

4. A patient weighing system as claimed in claim 3 and including means synchronously operative with said control clock and responsive to said remainder digital count in said third down counter for repetitively visually displaying change in patient weight.

* * * * *